Oct. 29, 1968  YOSHITOMO TEZUKA  3,407,913
SAFETY DEVICE IN PRESS MACHINE AND CONTROL DEVICE THEREFOR
Filed July 22, 1966  9 Sheets-Sheet 1

United States Patent Office 3,407,913
Patented Oct. 29, 1968

3,407,913
SAFETY DEVICE IN PRESS MACHINE AND CONTROL DEVICE THEREFOR
Yoshitomo Tezuka, Sagamihara-shi, Japan, assignor to Aida Iron Works & Co., Ltd., Sagamihara-shi, Japan
Filed July 22, 1966, Ser. No. 567,141
Claims priority, application Japan, Aug. 26, 1965, 40/51,667
3 Claims. (Cl. 192—129)

ABSTRACT OF THE DISCLOSURE

A safety device for a press which has a slidable member adapted to be driven by a coupling rod to apply pressure to a workpiece. An oil chamber is provided in the slidable member and has a removable pressure receiving member disposed therein which receives the pressure from the coupling rod. The pressure receiving member engages a seal member disposed in the periphery of the oil chamber. The space in the chamber beneath the pressure receiving member is supplied with oil under pressure, and the force acting on the coupling rod is transmitted to the slidable member through the oil in the chamber until the pressure exceeds a predetermined amount. Thereupon the oil is compressed sufficiently to separate the pressure receiving member from the sealing member, thereby allowing escape of pressure, which is sensed by a sensing means to actuate a stopping means for stopping application of pressure to the coupling rod.

---

The present invention relates to an improved safety device in a press machine and an improved control device for the safety device, and more particularly to a safety device adapted to automatically actuate the stop device of a press machine as soon as any overload condition develops in the machine, especially in the slidable member, hereinafter called the slide, of the machine, so as to safeguard the slide from damage which may otherwise be inflicted on a machine component, and a control device for such a safety device adapted to return the safety device to its original position upon completion of a cycle of operation of the safety valve.

One object of the present invention is to provide a safety device in a press machine which is adapted to displace the slide of the press machine regardless of the movement of the coupling rod or pitman rod of the machine when a workpiece or press moulds are subjected to a load over a predetermined value during the pressing operation with the press machine whereby the press machine, work piece or moulds may be protected against any damage which may otherwise be inflicted thereon.

Another object of the present invention is to provide a balancing device in a two-point press machine which drives its slide by means of a pair of coupling rods and incorporates a pair of such novel safety devices as referred to above therein, said balancing device being adapted to prevent the slide from tilting due to unbalancing force which may be developed when different loads are applied to two points on the slide during the press machine operation.

A further object of the present invention is to provide a control device for such a safety device adapted to return the safety device to its original position as soon as the safety device has performed its intended one cycle of operation and renders the safety device ready for the next cycle of operation.

The above and other objects and attendant advantages of the present invention will be more readily apparent to those skilled in the art from the following description when read in connection with the accompanying drawings in which.

Figure 8:
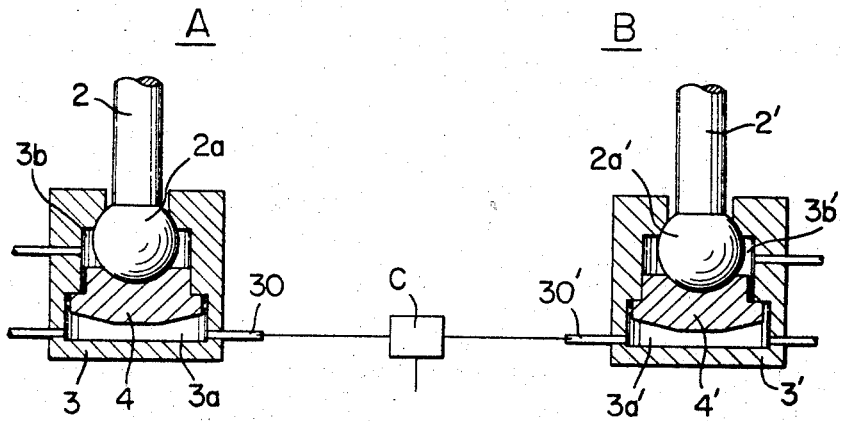
FIG. 8 is a fragmentary vertical sectional view showing an instance in which two identical safety devices embodying the present invention are employed in a two-point press machine.
Figure 9:
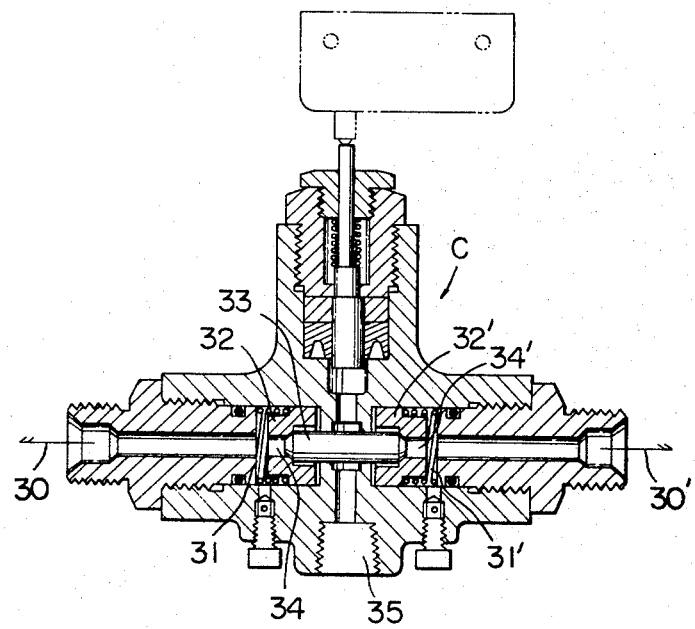

FIG. 9 is an enlarged fragmentary vertical sectional view of said balancer shown in FIG. 8; and FIGS. 10 through 13 are fragmentary vertical sectional views of a further alternative form of safety device having a control device therefore incorporated therein and which show said safety device and control device in different operative conditions during a cycle of operation of a press machine with which said devices are employed.

Figure 1:
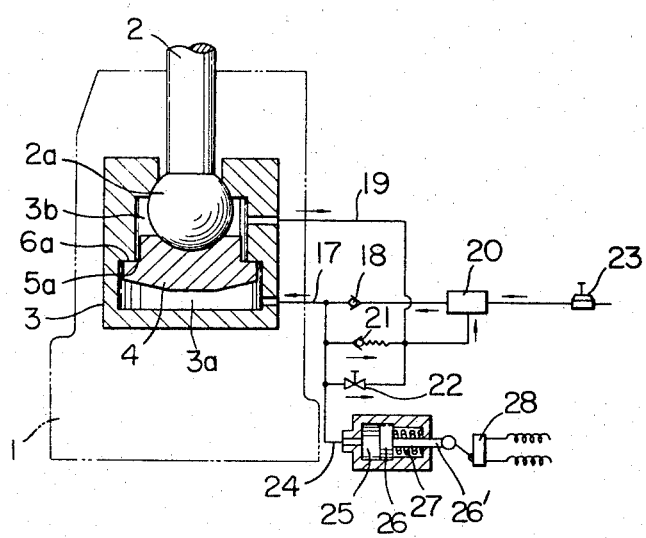
FIG. 1 is a schematic diagram explaining the principle of the present invention and showing a portion thereof in section.
Figure 2:
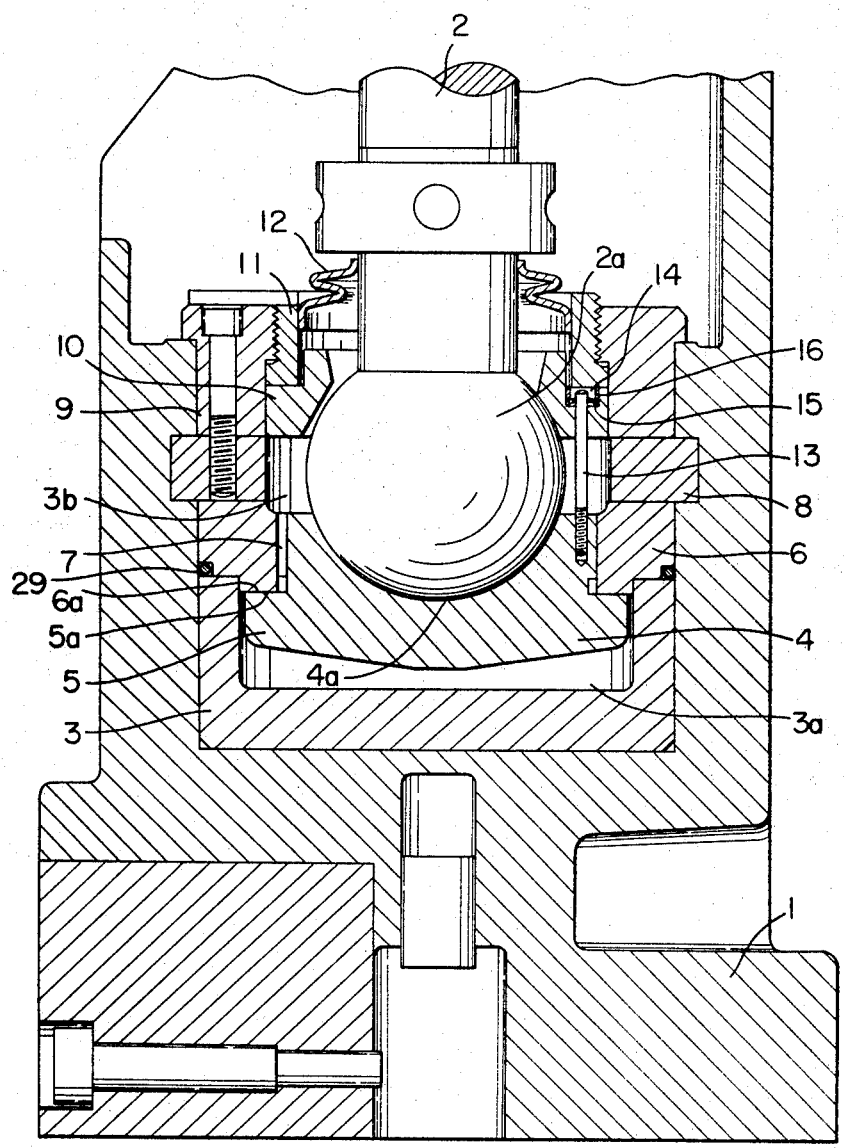
FIG. 2 is a fragmentary vertical sectional view of a preferred form of safety device embodying the present invention.

Referring now to FIGS. 1 and 2, numeral 1 designates the slide of a press machine (not shown) and the slide is adapted to be driven by a coupling rod 2 having a spherical ball 2a at its lower end which is operatively connected to the driving crank shaft (not shown) of the press machine to be driven thereby. An oil case 3 is rigidly positioned in a cavity in the slide 1 and the cavity of the oil case is divided into a lower oil chamber section of larger cross sectional area 3a and an upper oil chamber section 3b of smaller cross sectional area by means to be explained hereinafter.

An abutment or pressure receiving member 4 is housed within the oil case 3 for upward and downward movement therein. The abutment member 4 has an enlarged flanged portion 5 at its lower end which is positioned within the lower oil chamber portion 3a and a rounded concave recess 4a in the center of the upper surface thereof for receiving or abutting against the spherical ball 2a of the coupling rod 2 so as to receive pressure therefrom. The concave recess 4a in the upper surface of the abutment member 4 has a curvature which substantially corresponds to the curvature of the spherical ball 2a. An annular seal ring 6 is seated on the upper peripheral edge of the lower oil chamber section 3a with its inner periphery projecting inwardly of the oil case 3 and contacting the opposed outer periphery of the non-flanged upper portion of the abutment member 4 so as to divide the interior of the oil case 3 into the upper and lower chamber sections 3b and 3a in cooperation with the opposed outer periphery of the abutment member 4. The under surface 6a of the seal member 6 is adapted to contact the upper surface 5a of the flanged portion 5 of the abutment member 4. The outer periphery of the upper portion of the abutment member 4 is provided with a plurality of vertical grooves 7 (only one of them is shown in FIG. 2) and these grooves communicate with the upper oil chamber section 3b of the oil case 3. A split ring 8 is positioned in a peripheral notch formed in the inner surface of the slide 1 and is seated on top of the seal ring 6. The split ring 8 is held in position by means of bolts (only one of them is shown) which extend through the split ring and an annular ring retainer 9 positioned on the top of the ring 8 within the oil case 3. A ball stopper 10 is provided with its outer periphery in contact with the inner periphery of the ring retainer 9 for limiting the movement of the spherical ball 2a of the coupling rod 2. The ball stopper 10 is held in position by an annular holding member 11 which is in turn held in position by its threaded outer periphery in engagement with the opposed threaded inner periphery of the split ring retainer 9. A dust diaphragm 12 is provided with the upper end secured to the coupling rod 2 and the lower end secured to the annular holding member 11 by any suitable means, the dust diaphragm 12 being provided to prevent dust from invading the interior of the oil case 3. A plurality of threaded bars 13 (only one of them is shown in FIG. 2) are threaded into the abutment member 4 spaced at equal angles around abutment member 4 and these bars extend vertically of the abutment member 4. The upper ends of these vertically extending bars 13 extend loosely through the respective bores in the ball stopper 10 into the space 14 defined by the upper surface of the ball stopper 10 and the under surface of the annular holding member 11. An annular leaf spring 15 is disposed in the above-mentioned space 14 and the spring 15 is held in position there by means of a retaining ring 16. The upper ends of the above-mentioned bars 13 are tightly mounted is corresponding bores in the leaf spring 15. Thus, the abutment member 4 is normally held in suspension within the oil case 3 as shown in FIGS. 1 and 2 in a position in which the upper surface 5a of the flanged portion 5 of the abutment member 4 contacts the under surface 6a of the seal ring 6. Numeral 29 designates an O-ring disposed in a peripheral notch formed at the lower end of the seal member 6.

The lower oil chamber portion 3a of the oil case 3 has an opening formed in one side wall thereof, to which is connected a pressure line 17 having a check valve 18 therein and connected to the discharge side of a pump 20. The upper oil chamber portion 3b an opening formed in one side wall thereof, to which is connected a pressure line 17 having a check valve 18 therein and connected to the discharge side of a pump 20. The upper oil chamber portion 3b has an opening formed in one side wall thereof, to which is connected a discharge line 19 leading to the suction side of the pump 20. A safety valve 21 is disposed in a first branch line extending parallel to the pressure line 17 and a stop valve 22 is disposed in a second branch line in parallel to the pressure supply line 17 and the first branch line in which the safety valve 21 is disposed. A pneumatic pressure regulator 23 is disposed in a line extending from the oil pressure pump 20 to an associated air supply means in the system (not shown) to regulate pump 20. The lower oil chamber portion 3a also communicates through a line 24 which branches from an intermediate point of the pressure line 17 with an oil pressure-operated cylinder 25 in which a piston 26 is provided for reciprocal movement therein. The rod 26' of the piston 26 is surrounded by a coil spring 27 and the piston rod is operatively connected to a microswitch 28 which is, in the illustrated embodiment, electrically connected to the circuit of an electromagnetic control or stop device (not shown) for the clutch of the crank shaft (not shown).

A constant oil pressure is applied to the lower oil chamber section 3a of the oil case 3 by the oil pressure pump 20. The upper oil chamber section 3b of the oil case 3 is also filled with pressurized oil. Therefore, when the coupling rod 2 is driven for downward movement during the operation by the press machine with which the novel safety device is employed, the downward movement of the coupling rod 2 is transferred through the lower end spherical ball 2a, abutment member 4, oil within the lower chamber section 3a, oil case 3 to the slide 1 whereupon the slide performs a desired pressing operation on a work piece (not shown).

During the pressing operation, the oil pressure within the lower oil chamber section 3a is maintained at a value sufficient to permit the slide 1 to perform a desired pressing operation with a predetermined load and in this case the upper surface 5a of the lower end flanged portion 5 of the abutment member 4 is maintained in contact with the under surface 6a of the seal ring 6 under such a pressure thereby to prevent the oil within the lower oil chamber section 3a from leaking into the upper oil chamber section 3b and at the same time to permit the slide 1 to move downwardly, the pressure of the oil within the lower oil chamber section 3a being sufficient to prevent downward movement of abutment member 4.

If an overload condition takes place during the pressing operation, the slide 1 is subjected to a pressure in excess of a predetermined value, and therefore, the oil within the lower oil chamber section 3a is slightly compressed (changes in volume) and the upper surface 5a of the flanged portion 5 of the abutment member 4 moves out of contact with the under surface 6a of the seal ring 6 to leave a clearance therebetween whereby the pressurized oil within the lower oil chamber section 3a may rush through the clearance and vertical grooves 7 in the abutment member 4 into the upper oil chamber section 3b of the oil case 3. Whereupon the pressure within the lower oil chamber section 3a drops suddenly, and accordingly, the oil pressure within the cylinder 25 also drops whereby the piston 26 is urged toward the left (as seen in FIG. 1) within the cylinder 25 by the action of the coil spring 27 so as to actuate the microswitch 28. Thus, the clutch for driving the press machine is disengaged thereby to prevent the overload from being transferred from the slide to the coupling rod 2 and other related parts.

Then, as the crank shaft is rotated upon engagement of the clutch, the coupling rod 2 is caused to move upwardly and at the same time the abutment member 4 is also caused to move upwardly. In this case, the oil within the upper oil chamber section 3b flows back through the grooves 7 in the abutment member 4 and clearance between the under surface 6a of the seal ring 6 and upper surface 5a of the flanged portion 5 of the abutment member 4, and then the surfaces 5a and 6a come to contact each other again to seal the clearance therebetween and oil pressure is pumped from the oil pressure pump 20 to the lower section 3a whereby the pressure within the lower oil chamber section 3a will be maintained at the predetermined pressure value suitable to perform a predetermined pressing operation by the slide 1.

The valve 18 is provided to prevent oil from flowing back toward the pump 20 from the lower oil section chamber 3a, oil valve 21 is provided to relieve excess pressure generated by the pump 20. Valve 22 is provided to enable the oil pressure in lines 17 to be manually released to line 19.

Figure 3:
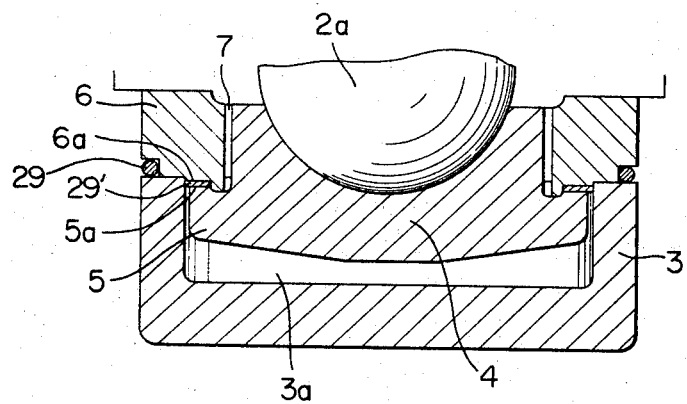
FIGS. 3 through 7 are fragmentary vertical sectional views of various alternative forms of safety devices embodying the present invention.
Figure 4:
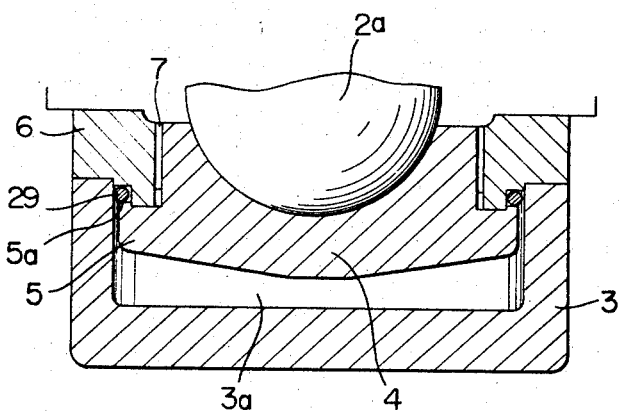
Figure 5:
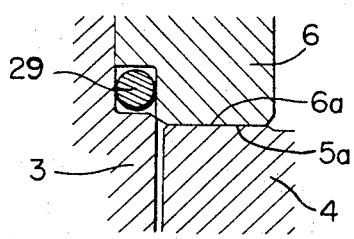
Figure 6:
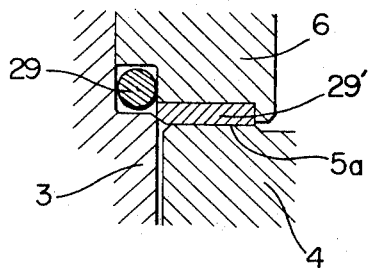
Figure 7:
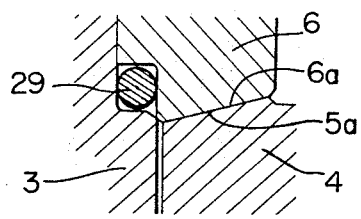

FIG. 3 shows an alternative embodiment of the safety device of the present invention and this embodiment is substantially the same as the foregoing embodiment except that the under surface 6a of the annular seal ring 6 has a sealing piece 29' embedded therein and the sealing piece may be formed of metal such as copper or aluminum or non-metallic material such as synthetic resin. FIG. 4 shows a further alternative embodiment substantially the same as the foregoing two embodiments except that the O-ring 29 is provided in a notch formed in the under surface 6a of the seal member 6 in the outer periphery thereof. FIG. 5 shows a further alternative embodiment of the safety device which is substantially the same as the embodiment shown in FIG. 4 except that the corners of the mating surfaces 5a and 6a of the abutment member 4 and seal member 6 are bevelled. FIG. 6 shows a further alternative embodiment of the safety device which is substantially the same as the embodiment of FIG. 5 except that in addition to the O-ring 29 shown in FIG. 5, a sealing ring 29' identical with that shown in FIG. 3 is embedded in the under surface 6a of the seal member 6. FIG. 7 shows a further alternative embodiment of the safety device which is substantially the same as that shown in FIG. 5 except that the mating surfaces 5a and 6a of the abutment and sealing members 4 and 6 are complementarily slanted.

FIG. 8 shows an embodiment in which two identical safety devices which may be any of the foregoing embodiments are employed in a conventional two-point type press machine. In this embodiment in order to prevent the slide 1 of the two-point press machine (not shown) from tilting due to imbalance which may develop when different magnitudes of loads are applied at the two operation areas in the two point press machine, a balancer C is provided between the two operation areas A and B of the machine and the balancer communicates at one end through a conduit 30 with the lower oil chamber section 3a of the oil case 3 of one safety device which is associated with the coupling rod 2 at the A area and communicates at the other end through a conduit 30' with the lower chamber section 3a' of the oil case 3' of the other safety device which is associated with the coupling rod 2' at the B area.

FIG. 9 shows the detailed construction and operation of the balancer C as shown in FIG. 8 on an enlarged scale. In the two-point press machine incorporating the two identical safety devices which may be any of the foregoing embodiments and the balancer C as shown in FIG. 8, therein, if overload takes place at the A area, for example, the oil pressure within the lower oil chamber section 3a of the oil case 3 of the safety device at the particular area drops suddenly resulting in the drop in the oil pressure within a cylinder 31 of the balancer C which is in communication with the conduit 30 which in turn is in communication with the lower oil chamber section 3a while the oil pressure within a similar second cylinder 31' on the side of the balancer opposite to the first cylinder 31 maintains a high value, and therefore, the piston 32' of the second cylinder 31' moves inwardly of its associated cylinder to push the piston 32 of the first cylinder 31 outwardly of the associated cylinder 31 through an intermediate needle valve 33 positioned between the two cylinders until the inward movement of the piston 32' is stopped by the inner wall of the associated cylinder 31'. After piston 32' has been stopped as mentioned above, the needle valve 33 continues to move forwardly pushing the piston 32 thereby independently of the piston 32' thereby to uncover the axial bore 34' of the second cylinder 31' whereupon the lower oil chamber section 3a' of the oil case 3' of the safety device at the B area which communicates through the line 30' to the second cylinder will be communicated with a vertical oil discharge passage 35 extending across the axial bores 34 and 34' of the two cylinders 31 and 31' whereby the oil pressure within the lower oil chamber section 3a' drops to a value corresponding to that of the oil pressure within the lower oil chamber section 3a of the oil case 3 of the safety device at the A area and as a result the A and B areas are balanced and the balanced state of the slide 1 may be restored so as to prevent the slide from tilting.

Figure 10:
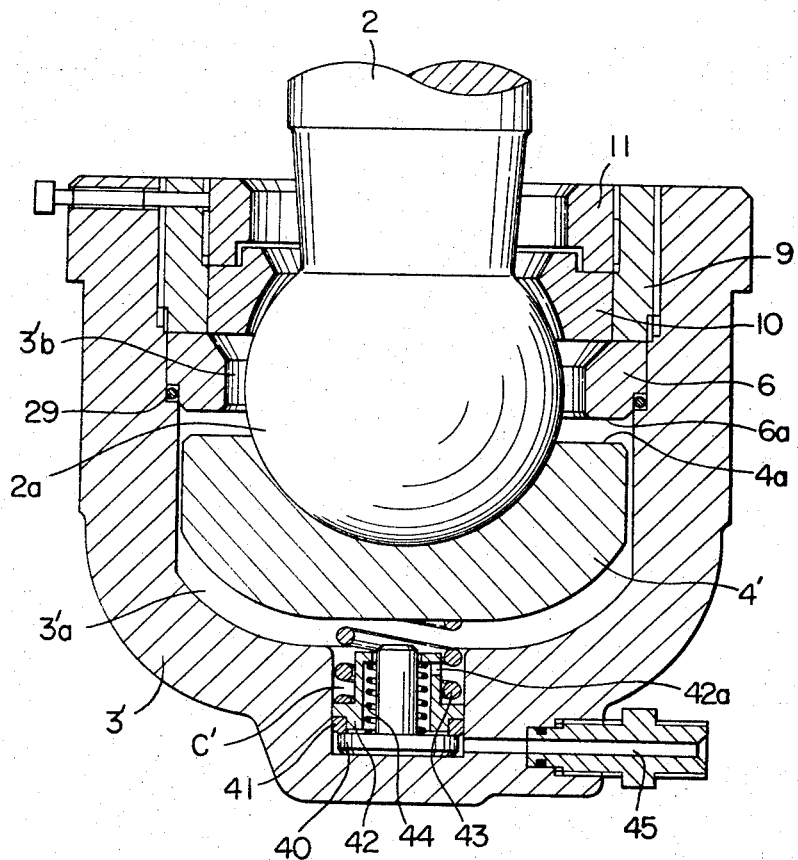
Figure 11:
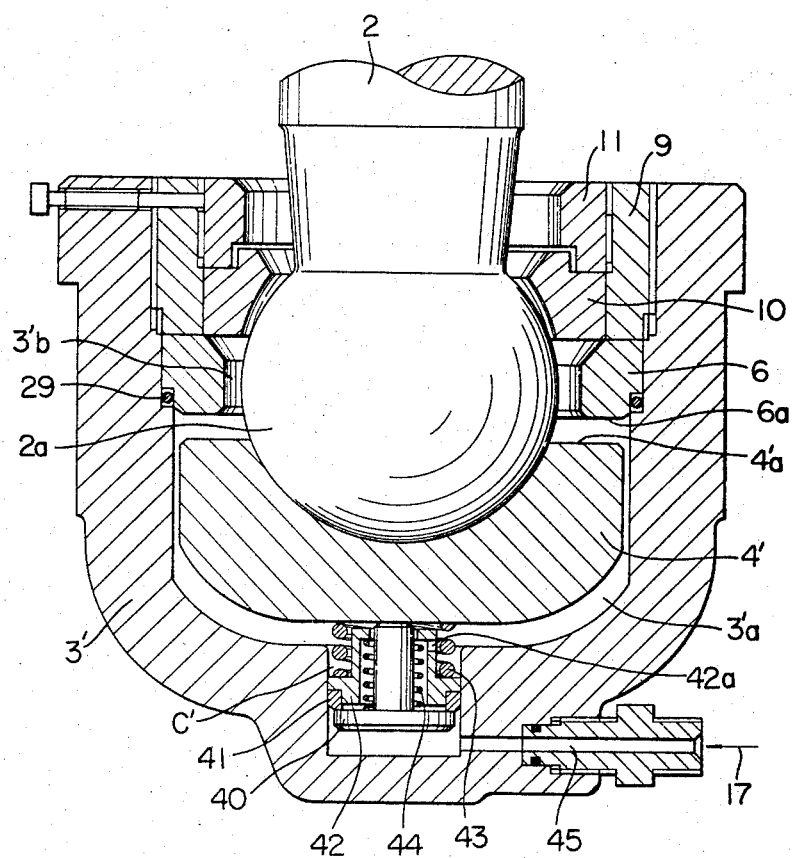
Figure 12:
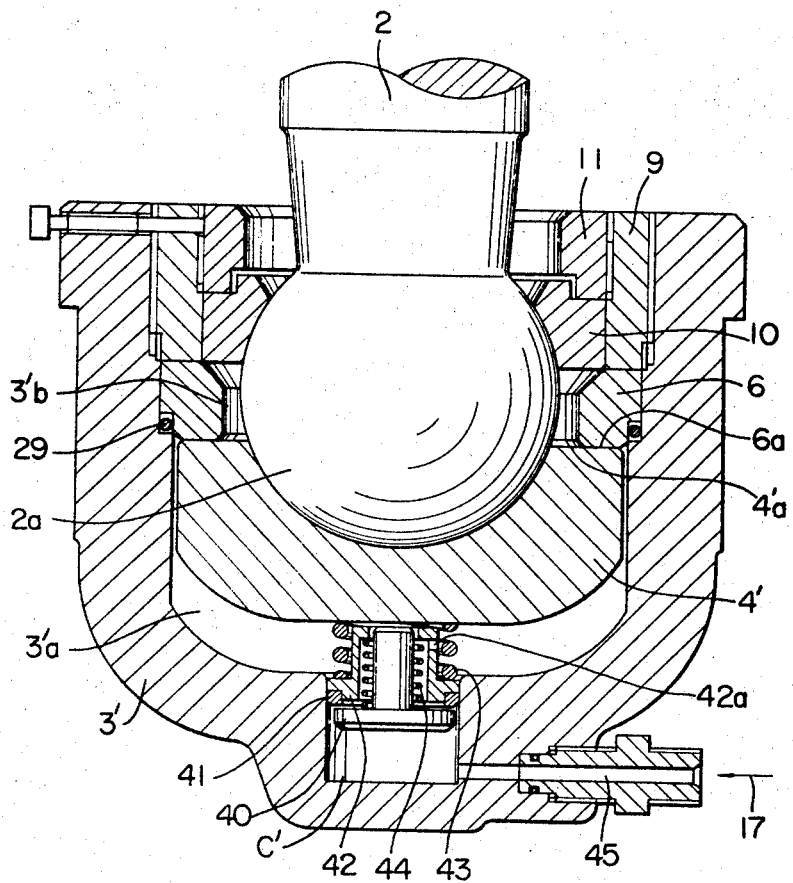
Figure 13:
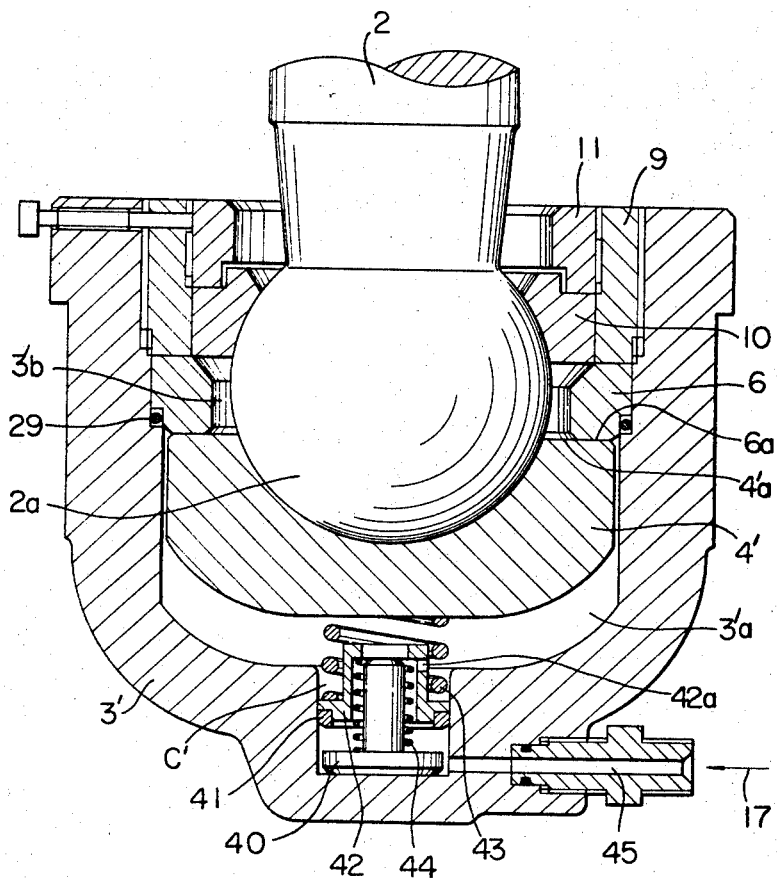

FIGS. 10 through 13 show a further alternative form of safety device which is adapted to be employed in conjunction with a control device therefor in order to positively return the safety device to its original position after a cycle of operation. The safety device shown in these figures is substantially the same as that of FIG. 2 except that the oil case is in the form of a substantially U-shaped cross sectional construction instead of a rectangular cross sectional construction as that of FIG. 2, the pressure receiving or abutment member is not provided with the flanged portion as shown in FIG. 2, the split ring is not provided, but the seal member is directly contacted by the annular retainer and held in position thereby, and the threaded bars, dust diaphragm and leaf spring are not provided and therefore, the other portions which are identical with those of the embodiment in FIGS. 1 and 2 are not necessary for explaining the relationship which this alternative embodiment has with respect to the novel control device and are omitted from the embodiment of FIGS. 10 through 13 in order to simplify the drawings. FIG. 10 shows the parts in position when an overload condition has developed in the system. FIG. 11 shows the condition when the control device is about to initiate its operation for returning the safety device to its original condition, FIG. 12 shows the positions of the parts when the lower oil chamber section has entrapped a predetermined value of oil pressure therein, and FIG. 13 shows the positions of the parts when the control device has completed a cycle of operation or when the safety device has been returned to its original condition.

The oil case 3' is divided into a lower oil chamber section 3'a and an upper oil chamber section 3'b by the seal member 6 and the cooperating abutment member 4', and when the lower oil chamber section 3'a is filled with high pressure oil the upper surface 4'a is in contact with the under surface 6'a of the seal member 6 as seen in FIG. 13. In this condition, when the coupling rod 2 connected to the crank shaft (not shown) is driven downwardly, the downward movement of the coupling rod is transferred through its lower end spherical ball 2a, the abutment member 4' and high pressure oil within the lower oil chamber section 3'a to the slide (not shown) whereupon the slide may perform a desired pressing operation on a work piece (not shown). A valve oil chamber C' is provided in the bottom wall of the oil case 3' just below the lower oil chamber section 3'a and valve oil chamber C' is in communication at its upper end with the lower chamber section 3'a and the lower end of the valve chamber C' is in communication with the axial bore 45 of an oil pressure cylinder transversely extending into the bottom wall of the U-shaped oil case 3'. A valve housing 42 is provided within the valve oil chamber C' and a T-type valve 40 is received within the valve housing 42 with the transverse bottom portion thereof projecting out of the housing. An annular valve retainer 41 is disposed around the valve housing 42 and seats on the projecting transverse bottom portion of the valve 40. A coil spring 44 is disposed around the valve 40 for normally urging the valve housing downward and a second larger coil spring 43 is disposed around the valve housing 42 within the valve oil chamber C'. The valve retainer 41 is formed of flexible material such as rubber or Teflon. Thus, it will be understood that the spring 43 also urges the valve 40 downward by the transverse bottom portion thereof which is in contact with the retainer 41. The valve 40 is loosely disposed within the valve housing 42 and is adapted to move vertically in unison with or independently of the valve housing 42 by means of the outer coil spring 44. Numeral 42a designates a transverse oil pressure passage formed in one side wall of the valve housing 42.

If any overload condition occurs in the system during the pressing operation, since resistance in a magnitude in excess of a predetermined value develops on the slide (not shown), the oil within the lower oil chamber section 3'a is slightly compressed (change in volume) due to the downward movement of the coupling rod 2. Whereupon the oil case 3' is caused to rise up relative to the rod 2 so as to separate the under surface 6a of the seal member 6 from its contact with the upper surface 4'a of the abutment member 4' leaving a clearance therebetween as seen in FIG. 10. Therefore, the safety device functions entirely in the same manner as the safety devices of the foregoing embodiments and at the same time the abutment member 4' presses spring 43 down so as to lower the valve housing 42 whereby the valve retainer 41 is urged against the valve 40.

In order to raise the valve 40, oil pressure is supplied from any suitable supply source (not shown) through the axial bore 45 of the transverse cylinder against the under surface of the valve 40 and as a result the valve 40 and the valve retainer 41 move upwardly in unison while maintaining their contact thereby to compress the spring 43 until the upper end of the valve 40 comes into contact with the bottom of the abutment member 4' whereupon the abutment member 4' is pushed upwardly so that the safety device may initiate its return movement (see FIG. 11).

As the abutment member 4' is moving upwardly when the upper surface 4'a of the abutment member 4' abuts against the under surface 6a of the seal member 6, the upward movement of the abutment member 4' is stopped (see FIG. 12) whereupon the oil pressure supplied through the cylinder bore 45 is applied against the under surface of the valve retainer 41 to thereby permit the oil pressure to be introduced into the valve housing 42 so as to raise the retainer and accordingly, to compress the coil spring 43 so that a clearance can be formed between the valve 40 and valve retainer 41 and the valve will be urged downwardly by the action of the spring 44. In this case the oil pressure within the valve oil chamber C' flows through the passage 42a formed in the valve housing 42 into the lower oil chamber section 3'a and the oil pressure within the valve housing drops to a predetermined level whereupon the valve housing descends by a predetermined distance depending upon the length of the spring 43 and maintains its stabilized state (see FIG. 13) thereby to return the safety device to its original condition.

As mentioned above, in any of the foregoing embodiments a clearance is formed between the contact surface of the abutment member and seal member by slightly varying the volume of pressurized oil within the lower oil chamber section and the oil within the lower chamber section is caused to rush through the clearance into the upper oil chamber section thereby to drop the oil pressure within the lower oil chamber section whereupon the safety device is actuated, and therefore, only a very short period of time elapses from the development of any overload condition until the initiation of the operation of the safety devices whereby the parts of the press machine can be positively protected against damage due to overload conditions developed in the system.

While various preferred embodiments of the invention have been shown and described in detail it will be understood that they are for the purpose of illustration only and are not to be taken as a definition of the scope of the invention, reference being had for this purpose to the appended claims.

What is claimed is:

1. A safety device for a press machine which has a slidable member adapted to be driven by a coupling rod to apply pressure to a workpiece, said safety device comprising an oil chamber in said slidable member, a movable pressure receiving member disposed for movement within said oil chamber and adapted to receive pressure from the coupling rod for moving the pressure receiving member in the chamber, an annular seal member disposed in the periphery of said oil chamber, said pressure receiving member dividing the chamber into an upper oil chamber portion and a lower oil chamber portion, said pressure receiving member having a sealing surface facing toward upper oil chamber portion and said annular seal member having a sealing surface facing toward said lower oil chamber portion and being opposed to said sealing surface of the pressure receiving member and abuttable thereby to form a seal between the sealing surfaces when the surfaces contact each other, oil pressure sensing means coupled to said lower oil chamber portion and adapted to be coupled to the press machine drive means driving the coupling rod for stopping the driving of the coupling rod, said upper oil chamber portion having an opening communicating with a space at atmospheric pressure, and oil supply means coupled to said oil chamber for supplying oil under high pressure to said lower oil chamber portion, whereby when a predetermined magnitude of pressure is applied to said pressure receiving member by said coupling rod the oil pressure in said lower oil chamber portion urges the pressure receiving member toward said upper oil chamber portion, said sealing surface on the pressure receiving member comes into contact with the sealing surface of the annular seal member whereupon the pressure receiving member imparts downward movement through the oil within said lower chamber portion to said slide, but when an overload condition develops in said press machine, the oil within said lower chamber portion is compressed so as to cause the volume of the oil within the lower chamber portion to change, said cooperating sealing surfaces on the pressure receiving member and seal member separate from each other so as to leave a clearance therebetween whereby the oil within said lower chamber portion can rush through said clearance into said upper oil chamber portion to reduce the oil pressure within the lower chamber portion resulting in activation of the pressure sensing means for stopping the driving of the coupling rod.

2. A safety device as claimed in claim 1 further comprising a control device in the end wall of said lower oil chamber portion remote from said upper oil chamber portion for returning said safety device to its initial position after one cycle of operation thereof, said control device comprising a valve oil chamber in said end wall opening into said lower oil chamber portion, a movable valve housing movable into and out of said valve oil chamber, and a T-shape valve member movable in said valve housing in the same direction as said valve housing is movable and engageable with the valve housing when in its position toward the lower oil chamber portion for closing the bottom of the valve housing, and spring means between said housing and said T-shape valve urging said valve into said valve oil chamber, said oil supply means being coupled to said chamber through said valve oil chamber, whereby when an overload condition develops in said press machine, the T-shape valve is urged upwardly by a predetermined oil pressure so as to cause the valve to close the bottom of the valve housing thereby raise the valve and valve housing to contact and push said pressure receiving member upwardly, and after said pressure receiving member has reached a predetermined height said valve descends independently of said valve housing, whereupon the oil pressure which was initially applied to the valve for urging the same upwardly is then caused to flow through the valve housing into said lower oil chamber portion of the safety device thereby to obtain a predetermined oil pressure within the lower oil chamber section.

3. A safety arrangement for a press machine which has a slidable member adapted to be driven by a pair of coupling rods spaced from each other on the slidable member to apply pressure to a workpiece, said safety arrangement comprising a safety device for each coupling rod, each safety device comprising an oil chamber in said slidable member, a movable pressure receiving member disposed for movement within said oil chamber and adapted to receive pressure from the coupling rod for moving the pressure receiving member in the chamber, an annular seal member disposed in the periphery of said oil chamber, said pressure receiving member dividing the chamber into an upper oil chamber portion and a lower oil chamber portion, said pressure receiving member having a sealing surface facing toward upper oil chamber portion and said annular seal member having a sealing surface facing toward said lower oil chamber portion and being opposed to said sealing surface of the pressure receiving member and abuttable thereby to form a seal between the sealing surfaces when the surfaces contact each other, oil pressure sensing means coupled to said lower oil chamber portion and adapted to be coupled to the press machine drive means driving the coupling rod for stopping the driving of the coupling rod, said upper oil chamber portion having an opening communicating with a space at atmospheric pressure, oil supply means coupled to said oil chambers for supplying oil under high pressure to said lower oil chamber portions, a pressure balancing device connected between the oil supply means and the oil chambers, whereby when a predetermined magnitude of pressure is applied to said pressure receiving members by said coupling rods, the oil pressure in said lower oil chamber portions urges the pressure receiving member toward the upper oil chamber portions, said sealing surfaces on the pressure receiving members come into contact with the sealing surfaces of the annular seal members whereupon the pressure receiving members impart downward movement through the oil within the lower chamber portion to said slide, but when an overload condition develops in said press machine, the oil within one or the other of said lower chamber portions is compressed so as to cause the valume of the oil therewithin to change, said cooperating sealing surfaces on the corresponding pressure receiving member and seal member separate from each other so as to leave a clearance therebetween whereby the oil within the lower chamber portion can rush through said clearance into said upper oil chamber portion to reduce the oil pressure within the lower chamber portion, the pressure balancing means reduces the pressure in the lower chamber portion of the other safety device, and the pressure sensing means is activated for stopping the driving of the coupling rods.

References Cited
UNITED STATES PATENTS

| | | | |
|---|---|---|---|
| 2,767,818 | 10/1956 | Huling | 192—150 |
| 2,937,733 | 5/1960 | Danly | 192—150 |
| 3,329,250 | 7/1967 | Horst-Egon Wach | 192—150 |
| 3,093,716 | 6/1963 | Horowitz | 137—557 |

MARTIN P. SCHWADRON, *Primary Examiner.*

C. M. LEEDOM, *Assistant Examiner.*